United States Patent [19]

Loveless

[11] Patent Number: 5,328,960
[45] Date of Patent: Jul. 12, 1994

[54] OIL SOLUBLE IONIC GRAFT COPOLYMERS

[75] Inventor: Frederick C. Loveless, Yardley, Pa.

[73] Assignee: Mobil Oil Corporation, Fairfax, Va.

[21] Appl. No.: 945,466

[22] Filed: Sep. 16, 1992

[51] Int. Cl.$^5$ ............................................. C08L 23/32
[52] U.S. Cl. .............................. 525/203; 525/192; 525/194
[58] Field of Search .................. 525/203, 192, 194

[56] References Cited

U.S. PATENT DOCUMENTS

| | | | |
|---|---|---|---|
| 2,367,468 | 1/1945 | Mixon et al. | 252/48 |
| 2,677,025 | 5/1954 | Bloch | 260/513 |
| 2,883,340 | 4/1959 | Wasley et al. | 252/33 |
| 3,325,418 | 6/1967 | Stuart | 252/32.7 |
| 3,352,782 | 11/1967 | Brasch | 252/47.5 |
| 3,396,136 | 8/1968 | Dickerson | 260/30.6 |
| 3,637,610 | 1/1972 | Jacobson | 260/78.5 T |
| 3,931,021 | 1/1976 | Lundberg | 252/32.5 |
| 3,941,834 | 3/1976 | Lee | 260/504 R |
| 3,950,401 | 4/1976 | Petrille et al. | 260/504 R |
| 3,954,915 | 5/1976 | Schwab et al. | 260/887 |
| 4,007,121 | 2/1977 | Holder et al. | 252/51.5 |
| 4,011,380 | 3/1977 | West et al. | 526/30 |
| 4,051,050 | 9/1977 | Elliot et al. | 252/51.5 |
| 4,080,304 | 3/1978 | Smith | 252/49.6 |
| 4,086,171 | 4/1978 | Wood et al. | 252/33 |
| 4,118,361 | 10/1978 | Lundberg | 260/31.8 |
| 4,146,489 | 3/1979 | Stambaugh et al. | 252/50 |
| 4,161,452 | 7/1979 | Stambaugh et al. | 252/34 |
| 4,170,562 | 10/1979 | West | 252/51.5 |
| 4,320,017 | 5/1982 | Spence | 252/43 |
| 4,372,862 | 2/1983 | Miller | 252/33 |
| 4,382,005 | 5/1983 | Miller | 252/32.7 |
| 4,382,007 | 5/1983 | Chafetz et al. | 252/51.5 |
| 4,402,844 | 9/1983 | Trepka | 252/51.5 |
| 4,448,974 | 5/1984 | O'Brien et al. | 548/550 |
| 4,480,063 | 10/1984 | Lundberg et al. | 525/203 |
| 4,502,972 | 3/1985 | Davis et al. | 252/47 |
| 4,517,104 | 5/1985 | Bloch et al. | 252/51.5 |
| 4,532,302 | 7/1985 | Wagensommer et al. | 525/343 |
| 4,552,916 | 11/1985 | Lundberg et al. | 524/516 |
| 4,557,847 | 12/1985 | Gutierrez et al. | 252/51.5 |
| 4,557,849 | 12/1985 | Eckert | 252/51.5 |
| 4,617,337 | 10/1986 | Lundberg et al. | 525/203 |
| 4,640,945 | 2/1987 | Peiffer et al. | 523/336 |
| 4,652,600 | 3/1987 | Thaler et al. | 524/547 |
| 4,665,115 | 5/1987 | Lundberg et al. | 525/203 |
| 4,696,775 | 9/1987 | David | 261/1 |
| 4,743,391 | 5/1988 | Gordon et al. | 252/55 |

*Primary Examiner*—Carman J. Seccuro, Jr.
*Attorney, Agent, or Firm*—Alexander J. McKillop; Malcolm D. Keen; Marina V. Schneller

[57] ABSTRACT

A lubricant additive which is the reaction product of polyvinylpyridine and sulfonated polyisobutylene is oil soluble and provides clear solutions in oil. These reaction products are ionic graft copolymers. The reaction products of the invention form solutions with lubricant base stocks, such as mineral oil, and are excellent Viscosity Index enhancers. Moreover, the reaction products of the invention act as thickening agents for the oil or grease of the lubricant composition of the invention, at very low levels of reaction product content.

9 Claims, 1 Drawing Sheet

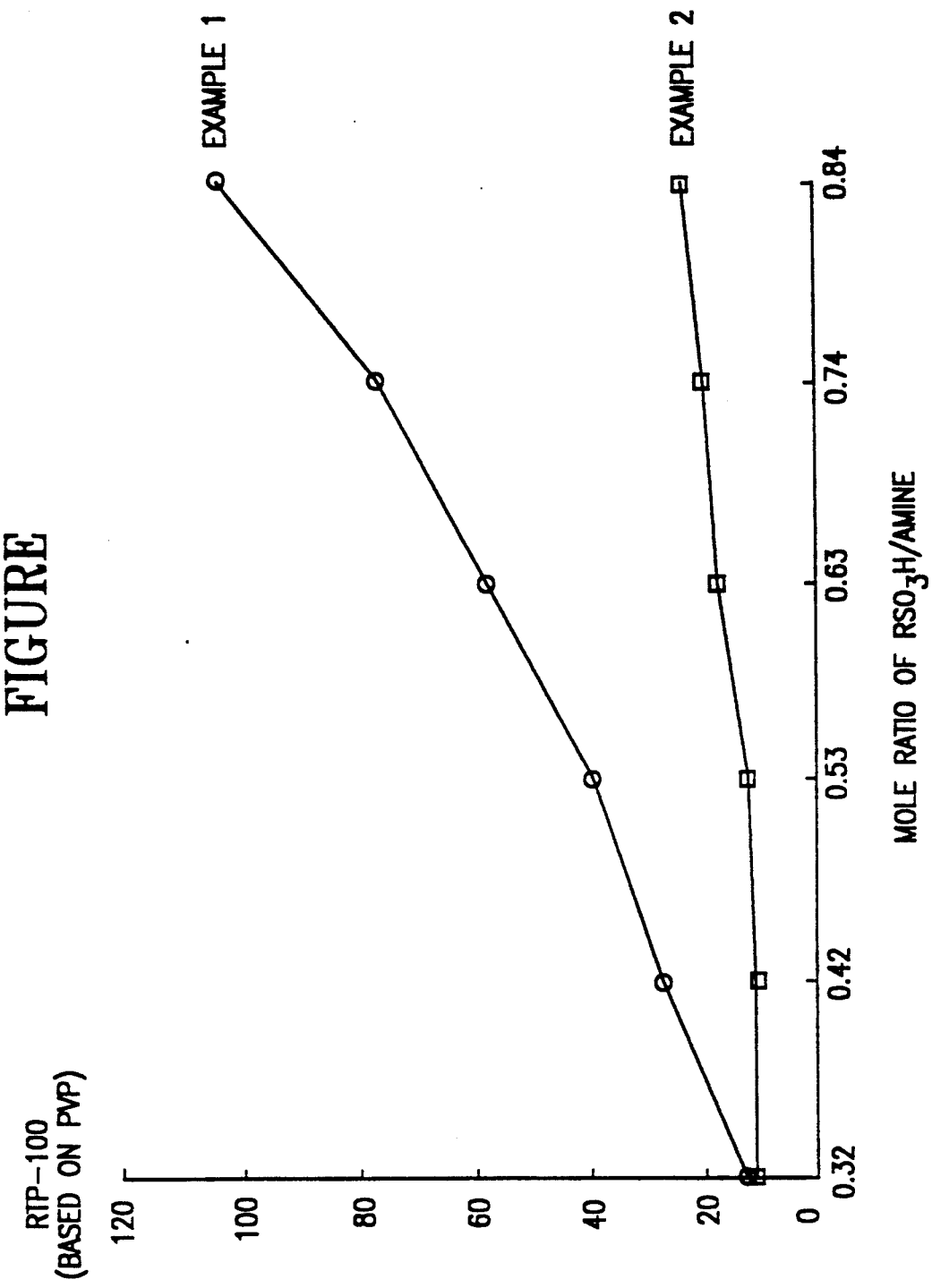
FIGURE

OIL SOLUBLE IONIC GRAFT COPOLYMERS

FIELD OF THE INVENTION

This invention relates to polymers which can act as thickeners and viscosity index improvers in lubricating or hydraulic oil formulations. In particular, this invention relates to ionic graft polymers formed by mixing polyvinylpyridine with sulfonated polyisobutylene. The polyisobutylene may optionally be neutralized with $Zn^{+2}$ before mixing with the polyvinylpyridine.

BACKGROUND OF THE INVENTION

Dispersant type Viscosity Index Improvers can be prepared by the modification of oil soluble polymers to provide functionality on the polymer which promotes dispersancy and detergency characteristics useful in preventing deposition of sludge and other deposits formed in the operation of gasoline or diesel engines. In the patent literature, a number of methods by which oil soluble hydrocarbon polymers may be modified to contain nitrogen and/or oxygen functionality are reported.

Other dispersant materials are prepared by sulfonation of polymers followed by neutralization. Some of the dispersant materials are polymer molecules having a multiplicity of sulfonate groups.

For example, U.S. Pat. No. 4,372,862 describes additives prepared by sulfonation of EPDM (ethylene propylene diene terpolymer) followed by neutralization with a variety of metal salts such as NaOH, KOH, LiOH, $Mg(OH)_2$. In U.S. Pat. No. 4,382,005, the preparation of sulfonated polymers wherein neutralization is performed using amines or ammonia is described. Other molecules, such as polyisobutylenes, can be sulfonated only once at most on each molecule.

SUMMARY OF THE INVENTION

It has now been found that sulfonated polyisobutylene or its zinc salts can be reacted with polyvinylpyridine to form oil soluble ionic graft polymers having excellent thickening ability, outstanding viscosity index enhancement and dispersant characteristics. Polyvinylpyridine is an oil insoluble polymer containing 13.33% nitrogen. Its reaction with sulfonated polyisobutylene to form oil soluble ionic graft polymers is illustrated as follows:

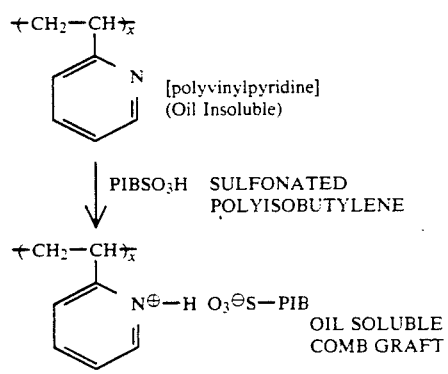

The high molecular weight polymeric spines of products of the invention are positively charged. By comparison, sulfonation and neutralization of, for example, EPDM produces high molecular weight polymeric spines which are negatively charged after neutralization.

The invention embraces additives which are the reaction product of polyvinylpyridine and zinc salts of $PIB$-$SO_3H$. The salts can be:

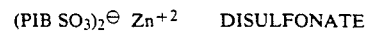

or

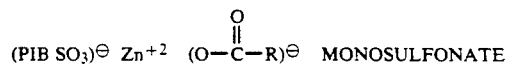

and the salts are formed by the reaction of the sulfonated polymer with a zinc dicarboxylate wherein R is 1 to 20 carbon atoms. These zinc salts can also be formed by reacting the sulfonated PIB with, e.g., $Zn(OH)_2$.

DESCRIPTION OF THE FIGURE

The Figure is a graph of the plot of RTP-100 vs. mole ratio of $RSO_3H$/Amine.

DETAILED DESCRIPTION OF THE INVENTION

The additive is the reaction product of polyvinylpyridine and sulfonated polyisobutylene. In particular, the invention relates to reaction products of polyvinylpyridine and sulfonated polyisobutylene which are oil soluble and provide clear solutions in oil. These reaction products are ionic graft copolymers. The reaction products of the invention form solutions with lubricant base stocks, such as mineral oil. Polyvinylpyridine itself is insoluble in oils. Accordingly, the solubility of the ionic graft copolymers of the invention is surprising.

The polyvinyl pyridine polymers contemplated herein have molecular weights ranging from one thousand to one million or more. The polyvinylpyridine is reacted with the sulfonated polyisobutylene such that the molar ratio of nitrogen to sulfur is 20:1 to 1:1. The reaction product of the invention will contain 5 to 35 weight percent of the reacted polyvinylpyridine. The polyvinylpyridine can be selected from the group consisting of 2-methyl, 5-vinylpyridine, 2- and 4-vinylpyridine, each of which are commercially available products.

The polyisobutylenes contemplated herein have molecular weights ranging from 300 to 10,000 wherein each molecule has at most one double bond. The sulfonated polyisobutylene is prepared by reacting polyisobutylene with a source of $—SO_3—$. The source of $—SO_3—$ can be acetyl sulfate, $CH_3—O—SO_3H$ (or) $CH_3COSO_3H$, chlorosulfonic acid or sulfur trioxide complexed with a suitable Lewis base. This reaction is undertaken in any inert anhydrous solvent. Advantageously, the choice of solvent is such that it is also a solvent for the polyvinylpyridine. Chlorinated aliphatic and aromatic solvents such as chlorobenzene or methylene chloride provide good media not only for the sulfonation but also for the subsequent reaction of sulfonated polyisobutylene with polyvinylpyridine. Conditions of sulfonation are not critical. Reaction temperatures can range from $-30°$ C. to $100°$ C., although temperatures above $40°$ C. should be avoided to prevent decomposition of the acidic product. Reaction time can vary from a few minutes to several hours depending on other conditions, such as reaction temperature. Sulfonated polyisobutylene is described in, for example, U.S. Pat. No. 3,931,021, which is incorporated by reference herein. As noted above, the sulfonated polyisobutylene can be reacted with e.g. Zn(OH)$_2$ to provide zinc salts of the sulfonated PIB, which in turn are reacted with the polyvinylpyridine. In addition to sulfonation of polyisobutylene, it is contemplated that other polymers containing only one double bond unsaturation can be sulfonated used in accordance with the invention. Examples of polymers other than isobutylene containing only one double bond per molecule include unhydrogenated polyalphaolefins, ethylene-propylene oligomers, and polypropylene.

The extent of reaction can be determined by titration of sulfonated polymer after any free acid has been washed out. In the sulfonation of polyisobutylene, which normally contains 0.85 to 1.0 double bonds per molecule, the mole ratio of sulfonating agent to polyisobutylene unsaturation can be 1:1 to 2:1, although each molecule can be sulfonated only once at most.

The reaction of polyvinylpyridine with sulfonated polyisobutylene or its zinc salt can be undertaken such that the molar ratio of nitrogen to sulfur ranges from 20:1 to 1:1, with the proviso that the weight percent polyvinylpyridine in the reaction product is less than 50%. This reaction is conveniently performed in a mutual solvent for the two reactants, such as methylene chloride.

The reaction is spontaneous and essentially instantaneous and is performed by simply mixing solutions of the two reactants at room temperature. The ionic graft polymers are conveniently isolated by evaporation of the solvent with steam.

If desired, a known amount of oil can be added to the polymer solution prior to solvent removal. Steam treatment then provides a known concentration of the graft polymer in oil. The amount of the polyvinylpyridine component in the ionic graft copolymer can range from 5 to 35 weight percent, preferably from 8 to 30 weight percent, and most preferably from 10 to 25 weight percent. Accordingly, the amount of sulfonated polyisobutylene, or its zinc salt, in the ionic graft copolymer will range from 65 to 95 weight percent, preferably from 70 to 92 weight percent, and most preferably from 75 to 90 weight percent. The amount of nitrogen in the ionic graft copolymer, provided by the polyvinylpyridine, will range from 1.0 to 6.0 weight percent, preferably from 2.0 to 5.0 weight percent, and most preferably from 1.5 to 3.0 weight percent.

The resultant ionic graft polymers were found to give clear solutions in oil even beyond 10 weight percent. This level far exceeds the normal use level contemplated. As noted above, this was surprising since polyvinylpyridine itself is completely insoluble in oil. Even more surprisingly, the polymeric salts proved to have a much greater thickening efficiency than would have been predicted and produced a viscosity index improvement greater than obtainable from most commercial V.I. improvers.

Very low levels of ionic polymers of the invention are required to achieve excellent thickening and viscosity index improvement. It can be seen in Table 1 that as little as 0.31 grams of polyvinylpyridine, as part of a graft polymer containing 88.9% sulfonated polyisobutylene, raises the viscosity of a 5 cSt base oil to over 14 cSt and produces a very high (194) viscosity index.

It is anticipated that the dispersant qualities of these ionic graft polymers should be outstanding because of their high nitrogen content. Moreover, in contrast to polydiene based polymers, no hydrogenation is required for these already saturated polymers. The predominant part of these molecules is inexpensive polybutene and the overall cost for the ionic grafts may be very competitive.

The additives of the invention can be used with lubricating oils to provide compositions which are solutions of the additive of the invention in the lubricating oil range product. The lubrication oil or hydraulic fluid may be a mineral oil, a synthetic oil, a synthetic hydrocarbon fluid, a synthetic or natural ester, or mixtures therof, or a grease in which any of the aforementioned fluids are employed as a vehicle. The product of this invention can be added to a base oil or fluid in an amount of about 0.1% to 10% by weight of the total composition. In general, mineral oils both paraffinic, naphthenic or mixtures thereof, may be employed as a lubricating oil or as the grease vehicle.

Mixtures of any or all the above may be utilized as the vehicle in which the additive may be dissolved for the purposes described. Typically, the kinematic viscosity at 100° C. of base stocks can range from 3.0 to 10.0 cSt, but base stocks with viscosities as high as 100 cSt at 100° C. are frequently used in lubricant compositions.

A variety of synthetic fluids may be utilized as base stocks. These include polyalphaolefins, alkylated aromatics, polyisobutylene, ethylene propylene oligomers, oil soluble polyglycols, simple and complex synthetic esters and alkylated aromatic ethers.

In preparing greases utilizing synthetic oils as the base fluid, any thickeners known in the art may be utilized in combination with the additives of this invention so long as there is no incompatibilizing interaction.

Where the lubricant is to be employed in the form of grease the lubricating oil is generally employed in an amount sufficient to balance the total grease composition, after accounting for the desired quantity of the thickening agent, and other additive components to be included in the grease formulation.

Conventional grease thickening or gelling agents which are compatible with the ionic graft copolymers and with which the ionic graft copolymers do not interact may include any of the conventional metal salts or soaps, which are dispersed in the lubricating vehicle in grease-forming quantities in an amount sufficient to impart to the resulting grease composition the desired consistency. Other thickening agents that may be employed in the grease formulation may comprise the non-soap thickeners, such as surface modified clays and silicas, aryl ureas, calcium complexes and similar materials. In general, grease thickeners may be employed which do not melt and dissolve when used at the required temperature within a particular environment; however, in all other respects, any material which is normally employed for thickening or gelling hydrocarbon fluids for forming grease can be used in accordance with the present invention.

It is to be understood that the lubricant compositions described here can also contain other materials. For example, corrosion inhibitors, extreme pressure agents, dispersants, additional viscosity index improvers, antioxidant, antiwear agents and the like can be used. These include but are not limited to, sulfonates, succinimides, zinc dialkyl dithiophosphates, and the like. These materials do not detract from the value of the compositions of this invention; rather the materials serve to impart their customary properties to the particular compositions in which they are incorporated. Overbased phenates are not particularly compatible with the products of the invention. Other additives such as friction modifiers, stabilizers, antirust agents, demulsifiers, metal deactivators, dyes and the like can be used with the additive of the invention. It is also envisioned that, in certain instances, the additives of this invention dissolved in the appropriate fluid would require no additional additives for the achievement of a given function.

EXAMPLES

Polyisobutylene Sulfonic Acid Preparation

Acetyl sulfate ($CH_3CO$—$OSO_3H$) was prepared by reaction of acetic anhydride and sulfuric acid in methylene chloride at 0° C. The solution could be stored in a refrigerator until ready for use. This reagent can be used for sulfonation of unsaturation or aromatic rings. For the preparation of the PIB sulfonic acid, AMOCO H-100 (approximately 950 M.W.) was dissolved in the methylene chloride and a stoichiometric amount of acetyl sulfate solution was added slowly with stirring. The formed PIB sulfonic acid can be stored for a short time in the refrigerator, if necessary, prior to neutralization. As desired, polymers of higher or lower molecular weight may be used to prepare these acids.

Poly-2-vinylpyridine Preparation

This polymer was prepared in a variety of molecular weights by reaction of 2-vinylpyridine with catalytic amounts of lithium diethylamide in toluene. Polymerization was essentially instantaneous and the insoluble polymer was filtered off. For catalyst removal, the polymer was dissolved in tetrahydrofuran and reprecipitated by the addition of water. The solid polymer was isolated by filtration and dried in a vacuum oven. Molecular weight control was achieved by varying catalyst concentration. LDA, like butyl lithium, produces one polymer chain per molecule.

In addition, polymers of 2- and 4-vinylpyridine can be purchased in a variety of molecular weights from Scientific Polymer Products, Inc., 6265 Dean Parkway, Ontario, N.Y., 14519.

Ionic Graft Polymer Preparation

The polyvinylpyridine to be grafted was dissolved in methylene chloride and the selected amount of PIB sulfonic acid solution was added slowly with rapid stirring. An immediate increase in viscosity occurred, signifying salt formation. After the selected amount of acid had been added, the polymer was isolated by slow addition of the methylene chloride solution to a large excess of rapidly stirred boiling water. The hot water dissolved residual acetic and sulfuric acids while steam distilling the solvent. The polymer separated from the water as an orange-red crumb. The crumb was washed with water until no acetic acid odor was evident and then dried at least 24 hours in a hot vacuum oven. The resultant dried ionic graft polymers were red soft plastics. When the weight ratio of PIB sulfonic acid to PVP was at least 2.5 to 1, these plastic materials were hydrocarbon soluble.

EXAMPLES OF THE INVENTION

The polymers of the invention will be compared, in the Examples below, with commercial V.I. improvers. The ionic graft copolymers of the invention, it will be seen, possess an excellent balance of thickening power and viscosity index improvement. Viscosity index is a parameter which relates the change in viscosity of a fluid with temperature. For lubricant applications, it is usually advantageous that viscosity changes of lubricating compositions are minimal, to provide relatively high viscosity at high temperatures and relatively low viscosity at low temperatures. The higher the viscosity index of a fluid, the less change in viscosity with temperature. Polymeric thickeners dissolved in base stocks normally increase viscosity index of the solution relative to the base stock. Mineral oil base stocks normally have a nominal 100 viscosity index or lower. Synthetic base stocks frequently have viscosity indices greater than 100. Viscosity index is determined by measuring the kinematic viscosity of fluids at 40° C. and 100° C., according to ASTM Method D-2270-74, and with the use of Viscosity Index Tables in Publication DS39B published by ASTM, 1916 Race Street, Philadelphia, Pa. 19103.

The thickening efficiency of the subject polymers will be rated using the quantity RTP-100. This is a measure of the thickening efficiency of a polymer relative to 100 cSt Polydecene (PAO) (as measured at 100° C.). It is a convenient comparative measure since, in contrast to most viscometric quantities, the value of RTP-100 varies only slightly with polymer concentration.

RTP-100 is determined by measuring the viscosity of a known concentration (normally 1–10%) of a polymer in a base oil. The amount of PAO-100 which would have been required to thicken the base fluid to the same viscosity can be calculated by the following equation:

$$\log KV_{100}(\text{Blend}) = \frac{X}{100} (2 - \log KV_{100} \text{ Base Oil}) + \log KV_{100} \text{ Base Oil}$$

In this equation, X is the % PAO-100 required to achieve the blend viscosity. The RTP-100 of the polymer in question then is $$RTP - 100 = \frac{X}{\text{wt. \% polymer}}$$

For example, dissolving 3.5 weight % of a polymer in a mineral oil base stock, whose kinematic viscosity neat is 5.05 cSt at 100° C., might produce a viscosity increase to 15.0 cSt. The amount of PAO-100 required to produce a 15 cSt blend is calculated:

$$\log 15 = \frac{X}{100} (2 - \log 5.05) + \log 5.05$$

$$X = 36.5\%$$

and the RTP of the polymer would be:

$$\frac{36.5}{3.5} = 10.4$$

EXAMPLE 1

This example illustrates the thickening and V.I. (viscosity index) improvement attainable by dissolving various ionic graft polymers in a mineral oil base. The mineral oil of this example had a kinematic viscosity of 5.05 centistokes (cSt) at 100° C. and a viscosity index of 100. This example also illustrates the effect produced by varying the ratio of amine and sulfonic acid in the preparation of the ionic polymers. The polyvinylpyridine (PVP) used in this example was prepared as described earlier and had a number average molecular weight (Mn) of 171,000 as measured by Gel Permeation Chromatography (GPC). The sulfonated polyisobutylene (SPIB) used was prepared by reaction of Amoco H-100 polybutene (M.W. approximately 950) with acetyl sulfate in methylene chloride solution. Six different polymers were prepared by varying the SPIB to PVP weight ratios from 3/1 to 8/1. The polymers were each isolated, dried and dissolved in the aforementioned mineral oil to give solutions containing 5 weight percent. The viscosity indices and thickening powers attained are detailed in the following table.

|  | A | B | C | D | E | F |
|---|---|---|---|---|---|---|
| SPIB/PVP weight ratio | 3 | 4 | 5 | 6 | 7 | 8 |
| RSO$_3$H/Amine Mole Ratio | 0.315 | 0.42 | 0.515 | 0.63 | 0.735 | 0.84 |
| Wt. % in Oil | 5 | 5 | 5 | 5 | 5 | 5 |
| Wt. % PVP in oil | 1.25 | 1.00 | .833 | .714 | .625 | .555 |
| KV, 100° C., cSt | 8.1 | 11.5 | 13.6 | 17.4 | 21.3 | 28.6 |
| KV, 40° C., cSt | 45.2 | 66.9 | 77.1 | 100 | 125.9 | 163.4 |
| V.I. | 154 | 167 | 182 | 191 | 196 | 217 |
| RTP-100 (Based on dissolved PVP) | 12.6 | 27.5 | 39.8 | 58 | 77.1 | 104.6 |
| RTP-100 (Based on total ionic graft) | 3.16 | 5.51 | 6.64 | 8.29 | 9.64 | 11.62 |

The thickening power (RTP) has been shown based on the amount of dissolved polyvinylpyridine (and ranges from 12.6 to 104.6), and based on the 5 weight percent total graft polymer. It is believed that the former number, based on weight percent of the high molecular weight polyvinylpyridine, is a more meaningful assessment of thickening power when comparisons with currently known polymeric thickeners are made.

Sulfonated polyisobutylene itself has very low thickening power and the observed thickening is caused by the ionic salt bonds on the PVP. It should be pointed out that polymer F, above, is a much better thickener than polymer A because it has more ionic salt structures on its backbone. It should also be noted that the actual amount of polyvinylpyridine in the 5% solution of polymer F was only 44% of that in the solution of polymer A.

Decreased amounts of the polymer principally responsible for thickening should give rise to benefits in lower deposit formation and increased shear stability.

EXAMPLE 2

This example illustrates the dramatic effect which the molecular weight of the polyvinylpyridine spine has on thickening power and viscosity index. The ionic graft polymers of this example were prepared from a low molecular weight (20,000) polyvinylpyridine available from Reilly Tar and Chemical Corporation. Solutions of the resulting ionic graft polymers were made in the same mineral oil employed in Example 1. This time, because of the lower molecular weight of the polyvinylpyridine, 10% solutions were employed to study the viscometrics properties. The following table illustrates that the response to changes in SPIB to PVP ratio using low molecular weight PVP are much less dramatic than those observed in Example 1.

|  | A | B | C | D | E | F |
|---|---|---|---|---|---|---|
| SPIB/PVP weight ratio | 3 | 4 | 5 | 6 | 7 | 8 |
| RSO$_3$H/Amine Mole Ratio | 0.315 | 0.42 | 0.525 | 0.63 | 0.735 | 0.84 |
| Wt. % in Oil | 10 | 10 | 10 | 10 | 10 | 10 |
| Wt. % PVP in oil | 2.5 | 2 | 1.67 | 1.43 | 1.25 | 1.11 |
| KV, 100° C., cSt | 11.2 | 9.85 | 9.44 | 10.6 | 10.6 | 11.0 |
| KV, 40° C., cSt | 74.4 | 67.5 | 64.0 | 72.3 | 71.6 | 71.9 |
| V.I. | 141 | 128 | 127 | 134 | 135 | 134 |
| RTP-100 (Based on dissolved PVP) | 10.67 | 11.18 | 12.57 | 17.38 | 19.87 | 23.47 |
| RTP-100 (Based on total ionic graft) | 2.67 | 2.23 | 2.10 | 2.48 | 2.48 | 2.61 |

The polymers of this example are essentially indistinguishable from each other as far as thickening power (based on total polymer) and V.I. enhancement are concerned. As the mole ratio of RSO$_3$H to amine increases from A to F, however, the number of ionic sites on the backbones increase so that less polyvinylpyridine is required to give the same thickening. Polyvinylpyridine is, by far, the most expensive ingredient in the graft polymer.

The data from Examples 1 and 2 can be plotted to emphasize the response of the high molecular weight PVP to increasing levels of PIB sulfonic acid. Since the molecular weight of the PVP from Example 1 is much greater than that from Example 2, the number of ionic salt bonds formed per molecule at a given sulfonic acid to amine ratio is correspondingly much greater also, resulting in dramatically higher thickening power. This is depicted in the FIGURE.

EXAMPLE 3

The prior examples illustrated the effect of changes in SPIB to PVP ratio on RTP-100 and V.I. This example illustrates that, in solutions of various ionic elastomers having nearly the same viscosity:

a) V.I. and RTP-100 correlate directly with molecular weight of the PVP at the same RSO$_3$H to amine ratio (compare A, B and C).

b) At constant PVP molecular weight, changes in the RSO$_3$H to amine ratio do not control V.I. as they do RTP-100 (compare C, D and E).

|  | A | B | C | D | E |
|---|---|---|---|---|---|
| SPIB/PVP weight ratio | 7 | 7 | 7 | 5 | 4 |
| RSO$_3$H/Amine Mole Ratio | 0.735 | 0.735 | 0.735 | 0.525 | 0.42 |
| PVP (Mn x 10$^{-3}$) | 20 | 80 | 170 | 170 | 170 |
| Wt. % Polymer in Oil$^{(4)}$ | 10 | 5 | 3.4 | 5 | 5 |
| Wt. % PVP in oil$^{(4)}$ | 1.25 | 0.625 | 0.425 | 0.833 | 1.0 |
| KV, 100° C., cSt | 10.6 | 10.67 | 13.5 | 13.6 | 11.5 |
| V.I. | 135 | 168 | 173 | 182 | 167 |
| RTP-100 (Based on PVP) | 19.9 | 40 | 75.5 | 39.8 | 27.6 |

EXAMPLE 4

This example compares the thickening power and V.I. improvement attainable from the ionic grafts of this invention with the results from commercial polymers.

|  | A | B | C | D | E | F | G | H |
|---|---|---|---|---|---|---|---|---|
| Mineal Oil, wt. %[1] | 97.5 | 99.3 | 98.8 | 90 | 88 | 88 | 88 | 88 |
| Ionic Graft[2] | 2.5 | | | | | | | |
| Shellvis 40 | | 0.7 | | | | | | |
| Shellvis 50 | | | 1.2 | | | | | |
| Acryloid HF-848[3] | | | | 10[3] | | | | |
| Paratone 715[4] | | | | | 12[4] | | | |
| Paratone 735[4] | | | | | | 12[4] | | |
| Paratone 755 | | | | | | | 12[4] | |
| Paratone 855 | | | | | | | | 12[4] |
| KV, 100° C., cSt | 9.99 | 9.16 | 10.38 | 8.67 | 10.6 | 12.2 | 9.62 | 12.4 |
| V.I. | 199 | 164 | 169 | 221 | 150 | 154 | 145 | 143 |

[1] $KV_{100} = 4$ cSt
[2] High M.W. PVP. $RSO_3H$/PVP = 8. actual % PVP in oil = 0.278.
[3] Added as about 50% in oil. actual polymer wt ~ 5 g.
[4] Added as 10-15% solutions in oil. actual polymer wt 1-1.5 g.

As can be seen, Solution A, prepared by dissolving 2.5 wt.% ionic graft polymer, actually contained only 0.278 wt.% high molecular weight polymer. The calculated RTP-100 based on this figure is 102. The next best thickener listed was Shellvis-40, having an RTP-100 of 36.8. The ionic graft polymer produced a V.I. of 199, second only to the acryloid polymethacrylate. The RTP-100 of the acryloid polymer was however estimated to be about 4.81. The balance of V.I. and thickening power achieved by the ionic graft polymer is unique among the evaluated polymers.

EXAMPLE 5

This example illustrates the preparation of ionic graft polymers in which the sulfonated polyisobutylene (SPIB) is neutralized with zinc acetate prior to mixing with polyvinylpyridine (PVP).

Polymer 5-A was prepared by mixing 50 grams of sulfonated polyisobutylene (prepared as described previously and dissolved in 500 ml methylene chloride) with a solution of 10.88 grams of zinc acetate dihydrate dissolved in 150 ml methanol. The mole ratio of SPIB to Zn was 1 to 1 thus producing a zinc monosulfonate.

Polymer 5-B was prepared identically except that 5.44 grams of the zinc salt were used, thus producing a zinc disulfonate.

Using the proper amount of the solutions of polymers 5-A and 5-B, they were blended with a methylene chloride solution of polyvinylpyridine (170,000 Mn) as detailed in the following table:

|  | 5-1 | 5-2 | 5-3 | 5-4 |
|---|---|---|---|---|
| PVP, grams | 0.5 | 0.5 | 0.5 | 0.5 |
| ZnSPIB 5-A, grams | 5 | 6.5 | — | — |
| $Zn(SPIB)_2$ 5-B, grams | — | — | 5 | 6.5 |

The polymers were isolated by treatment with steam as described earlier.

Five percent solutions of each of the polymers were made in the mineral oil base stock utilized in Example 4. All polymers gave clear solutions. The viscometric properties are shown in the following table.

| | Polymer | | | |
|---|---|---|---|---|
| | 5-1 | 5-2 | 5-3 | 5-4 |
| Wt. % in oil | 5 | 5 | 5 | 5 |
| Wt. % PVP in solution | 0.4545 | 0.357 | 0.4545 | 0.357 |
| $KV_{100}$, cSt | 11.6 | 12.8 | 9.95 | 11.9 |
| $KV_{40}$, cSt | 56.7 | 71.6 | 50.7 | 63 |
| V.I. | 205 | 181 | 187 | 188 |
| RTP-100 (based on dissolved PVP) | 73 | 101 | 62 | 95 |

The pre-neutralized polymers of this example, in addition to having excellent thickening power and V.I. enhancement, were observed to be more compatible with crankcase additive packages than the polymers of the previous examples.

Thus it is apparent that there has been provided, in accordance with the invention, a lubricant additive which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An oil soluble ionic graft copolymer comprising
   5 to 35 weight percent polyvinylpyridine consisting essentially of vinylpyridine and
   65 to 95 weight percent a sulfonated polyisobutylene or salts thereof,
   wherein the sulfonated polyisobutylene is sulfonated only once at most on each molecule and wherein the copolymer is characterized by a molar ratio of nitrogen, provided by said polyvinylpyridine, to sulfur, provided by said sulfonated polyisobutylene or salts thereof, which ranges from 20:1 to 1:1 wherein the sulfonated polyisobutylene contains 0.85 to 1.0 double bonds per molecule, and each molecule is sulfonated once at most.

2. The copolymer of claim 1 wherein the polyvinyl pyridine in the graft copolymer ranges from 8 to 30 weight percent.

3. The copolymer of claim 1 wherein the polyvinyl pyridine in the graft copolymer ranges from 10 to 25 weight percent.

4. The copolymer of claim 1 wherein the polyvinylpyridine is formed from 2- or 4-vinylpyridine.

5. The copolymer of claim 1, wherein the ionic graft copolymer has a nitrogen content which ranges from 1.0 to 6.0 weight percent.

6. The copolymer of claim 1, which is a reaction product formed by contacting the polyvinylpyridine with sulfonated polyisobutylene.

7. The copolymer of claim 6, wherein the sulfonated polyisobutylene is treated with a zinc salt, prior to said contacting.

8. The graft copolymer of claim 1, wherein the polyvinylpyridene is a homopolymer.

9. The graft copolymer of claim 8, wherein the polyvinylpyridine is formed by polymerization of 2-vinylpyridine.

* * * * *